Dec. 4, 1962 — W. HUBER — 3,067,123
APPARATUS FOR REGULATING CURRENT DENSITY AND
OTHER FACTORS IN AN ELECTROLYTIC BATH
Filed Dec. 15, 1959
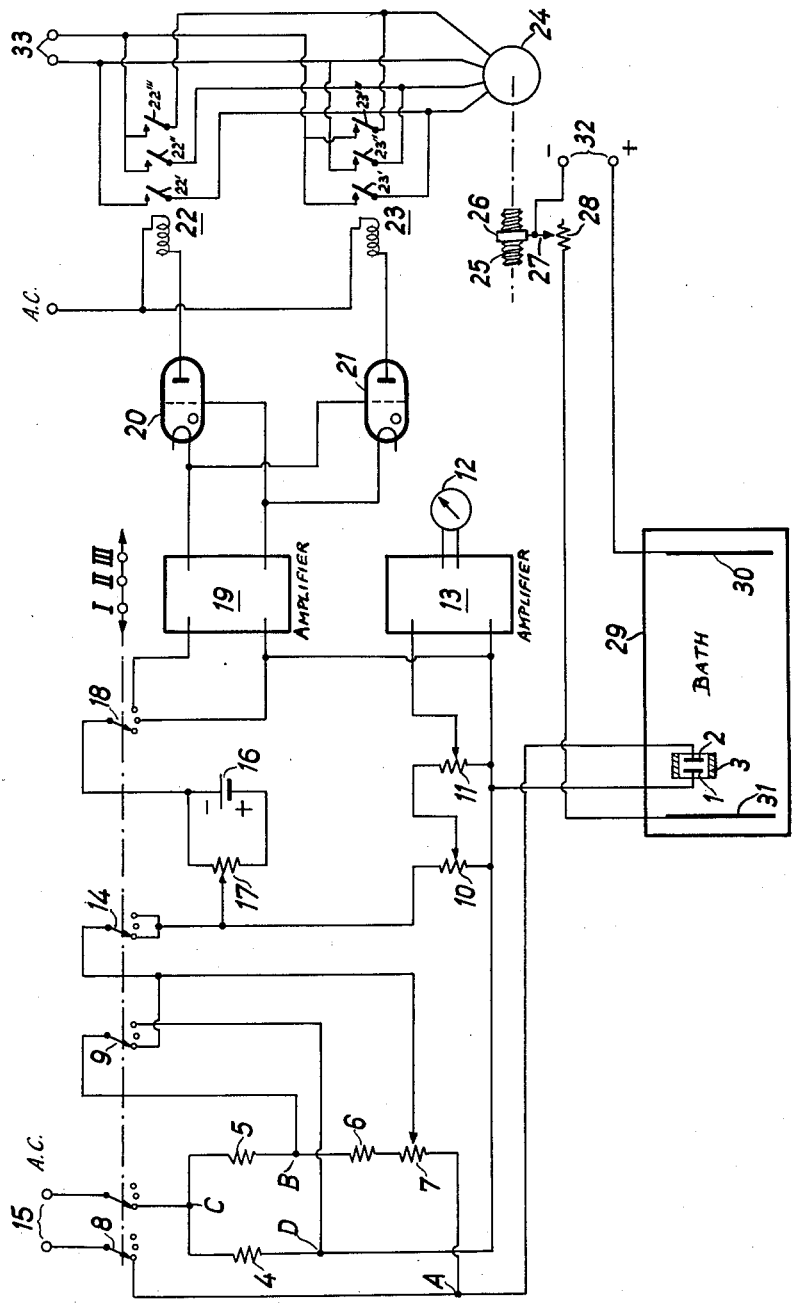
Inventor:
Willy Huber
BY Michael S. Striker
Attorney United States Patent Office 3,067,123
Patented Dec. 4, 1962

3,067,123
APPARATUS FOR REGULATING CURRENT
DENSITY AND OTHER FACTORS IN AN
ELECTROLYTIC BATH
Willy Huber, Beethovenstrasse 43, Zurich, Switzerland
Filed Dec. 15, 1959, Ser. No. 859,795
Claims priority, application Switzerland Dec. 17, 1958
8 Claims. (Cl. 204—231)

The present invention concerns an arrangement for regulating the current density and other factors in an electrolytic bath, and more particularly for adjusting the current density in a particular area of the bath to a predetermined desired value.

The electrolytic bath in question may be one of several types thereof as for instance a bath for producing electrolytic deposits or a bath for electrolytic surface treatment, e.g. electrolytic oxidation or electrolytic polishing. The arrangement according to the invention is also intended to regulate or predetermine certain factors depending on the current density in a particular area of the bath, as for instance the duration of the electrolytic process or the amount of thickness of the electrolytic deposit produced within a given time period or during unit of time.

It is therefore a main object of the present invention to provide for an arrangement permitting in an extremely simple and most efficient manner the determination of certain controlling factors and the automatic regulation of the current density in a selected area of the electrolytic bath.

Other objects and advantages of the invention will become apparent from the following description.

With above objects in view, an arrangement for regulating the current density and related factors in an electrolytic bath equipped with anode and cathode means immersed in an electrolyte comprises, according to the invention, a pair of probe electrodes immersed in the electrolyte in the area where the current density is to be regulated to a predetermined value, the probe electrodes being spaced from one another in direction of the current flowing between said cathode and anode means for determining a correspondingly directed potential gradient between the probe electrodes. The arrangement further contains a source of adjustable direct current reference voltage connected in series with the probe electrodes in such a manner that the polarity of the reference voltage is opposed to said potential gradient. In addition, the arrangement comprises electrically controllable current regulator means including current varying means connected with said cathode and anode means for regulating the current flowing therebetween, said series-connected reference voltage source and probe electrodes being connected with the input terminals of said electrically controllable current regulator means for applying an input voltage thereto, and said regulator means being operative in such a manner that said current is reduced by said current varying means when said input voltage has one polarity due to the potential difference between said probe electrodes being greater than the opposed reference voltage, and is increased when said input voltage has opposite polarity due to said potential difference being smaller than the opposed reference voltage.

In a preferred embodiment, the arrangement set forth above further comprises a measuring means for measuring the conductivity of the electrolyte between the probe electrodes, control means for adjusting said reference voltage to a predetermined potential difference, indicator means connected with said measuring means and calibrated for indicating potential differences and values proportional to such potential differences, and circuit means interconnecting said probe electrodes, said source of reference voltage, said indicator means, said current regulator means, and said measuring means and including multi-pole switch means movable between a plurality of positions for alternatively connecting, in one position, said reference voltage source and control means with said measuring means, in a second position said probe electrodes with said measuring means, and in a third position said probe electrodes in series with said reference voltage source and control means, and the resulting series combination in circuit with said electrical regulator means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing which illustrates diagrammatically a preferred embodiment of the invention, showing the main components and the pertaining circuitry.

Referring now to the drawing, the elements 1 to 13 constitute an arrangement for determining the current density in a selected area of the electrolyte and for determining related factors depending on such current density. This part of the arrangement is described in more detail in my copending patent application, Serial Number 816,805, filed May 29, 1959, and entitled "Apparatus for Determining the Density of a Direct Current." This portion of the present arrangement comprises two probe electrodes 1 and 2 mounted within a tubular member 3 made of insulating material and spaced from one another a certain distance. The probe electrodes 1 and 2 may be connected alternatively by means of change-over switch means 9, 14 either as one leg of a bridge circuit, or with the input of a device for measuring a potential difference. The other legs of the bridge circuit are constituted respectively by a resistor 4, a resistor 5 and a variable resistor 7, the movable tap of the last mentioned resistor constituting one corner of the bridge circuit.

The device for measuring a potential difference comprises two variable voltage dividers 10 and 11 connected with the input of an amplifier 13 and an indicating instrument 12 connected with the output of the amplifier 13. The variable resistor or potentiometer 10 is calibrated and provided with index marks for setting the movable tap thereof in such a manner that the various index marks correspond to various metals to be electrolytically deposited. The ratio between the input and the output voltages of this potentiometer 10 is proportional to the ratio between the electrochemical equivalent weight and the specific weight of these metals. The second variable resistor or potentiometer 11 is similarly calibrated and marked in reference to percentages of the electrolytic efficiency present at any time in the electrolytic process so that the voltage applied to the potentiometer 11 is divided in the various settings of the pertaining tap in accordance with such percentages. The indicating intrument 12 is calibrated and marked in units of the current density existing between the prode electrodes 1 and 2. This calibration and marking of the instrument 12 is correct and applies whenever the potentiometers 10 and 11 are adjusted to a voltage dividing ratio 1 : 1 and when the tap of the variable resistor 7 is adjusted in a manner described further below. In addition, the indicating intrument 12 is provided with a graduation calibrated and marked in units of the thickness of the electrolytic deposit produced during a unit of time. This second graduation is readable and applies when the potentiometers 10 and 11 are adjusted in accordance with present or desired operating conditions and when the tap of the variable resistor 7 is adjusted as also will be described further below. The input of the potentiometer 10 is connected via a change-over switch member 14 with the tap of the variable resistor 7.

Preferably, the change-over switch members 9 and 14 are parts of a multi-pole change-over switch device comprising also the change-over switch members 8 and 18, jointly movable between positions I, II and III as indicated diagrammatically in the drawing.

When the switch members 8, 9 and 14 are in the position I, i.e. in the position farthest to the left as shown in the drawing, an alternating voltage fed to the input terminals 15 is applied across the diagonal A—C of the bridge circuit constituted by the elements 1, 2; 4; 5; and 6 with respective portions of 7. Simultaneously, the device for measuring a potential difference containing the elements 10, 11, 12, 13 is connected as bridge indicator means across the diagonal B—D of the bridge circuit. On the other hand, when the switch members 8, 9 and 14 are in position III, i.e. the position farthest to the right as seen in the drawing, then the bridge circuit 1—7 is not energized because the source of alternating current is cut off at 8 while the component resistances 4 and 5 are short-circuited by the switch member 9 and the probe electrodes 1 and 2 are connected in series with the variable resistor 7 and with the auxiliary resistor 6. Consequently, a potential difference between the now interconnected points B and D, on one hand, and the tap of the variable resistor 7, on the other hand, is applied to the input of the measuring device 10—13 for being measured and indicated.

The arrangement shown in the drawing further comprises a source of direct current potential 16 which is in circuit with a variable resistor or potentiometer 17 whereby and adjustable reference voltage is available for the current regulating procedure. The positive polarity of this reference voltage is applied to the input of the potentiometer 10 as well as to the first and last stationary contact of the change-over switch member 14, while the negative polarity of the reference voltage can be applied alternatively, by means of the change-over switch member 18, to one or the other of the input terminals of an amplifier 19. One of these input terminals of amplifier 19 is also connected with one of the input terminals of the amplifier 13.

It can be seen from the drawing that when the switch members 14 and 18 are in the position II, the adjusted direct current or reference voltage available at the tap of the potentiometer 17 is applied to the input of the device 10—13 for measuring a potential difference, while in position III of the switch members 9, 14 and 18, the reference voltage available at the tap of the potentiometer 17 is applied to the input of the amplifier 19 in series with the potential difference between the probe electrodes 1 and 2 appearing between the movable tap of the variable resistor 7, on one hand, and the interconnected points B and D. It should be noted that in this case the reference voltage and the potential difference between the probe electrodes are of opposite polarity. Thus, the overall potential across the just mentioned series-combination is the algebraic sum of the adjusted reference voltage and the potential difference between the probe electrodes, i.e. across the series-combination a potential difference will be available which depends upon whether the adjusted reference voltage is larger or smaller than the potential difference between the probe electrodes, the effective polarity of that potential difference across the series-combination also depending upon the above mentioned relation between the reference voltage and the potential difference between the probe electrodes.

The amplifier 19 constitutes one element of a current regulator arrangement which, in this preferred embodiment, also comprises two thyratrons 20 and 21, the control grid circuits whereof are connected in push-pull arrangement with the output terminals of the amplifier 19. The anode circuits of the thyratrons 20 and 21 contain relay coils 22, 23, respectively, which operate the corresponding contacts 22' to 22''' and 23' to 23''', respectively. A reversible motor 24 is connected with the input terminals 33 for being energized from an outside source of electric energy, the various connection between the motor 24 and the terminals 33 including, respectively, the above mentioned relay contacts in such a manner that the motor 24 will turn in one direction when relay 22 is energized, but in the opposite direction when relay 23 is energized. The trough 29 contains an electrolytic bath in which are immersed at a selected area the probe electrodes 1 and 2 with their surrounding tube 3, and so are the anode 30 and cathode 31. The anode 30 and cathode 31 are connected with a source of direct potential at 32, a variable current regulating resistor 28 being connected, is this case, between the negative terminal 32 and the cathode 31. The movable tap 27 of the resistor 28 can be adjusted both in current increasing direction and in current decreasing direction by means of an adjusting device comprising a nut 26 carrying the tap 27 and a spindle 25 cooperating with the nut 26 and rotated in one or the other direction by the motor 24. The relay coils 22 and 23 are so connected with the thyratrons 20, 21, respectively, and the latter are so connected with the amplifier 19, that the motor 24 will move the tap 27 in current decreasing direction whenever the input voltage applied to the amplifier 19 has the same polarity as the potential difference existing between the probe electrodes 1 and 2, i.e. when the potential difference between the probe electrodes appearing at the input of the potentiometer 10 is larger than the reference voltage adjusted at the potentiometer 17 in which case only the one of the thyratrons, namely, the thyratron 21 is ignited. On the other hand, the above mentioned connections are such that the motor 24 will move the tap 27 in current increasing direction when the input voltage at the amplifier 19 has the same polarity as the reference voltage, i.e. when the potential difference between the probe electrodes 1 and 2 appearing at the input of the potentiometer 10 is smaller than the reference voltage adjusted at the potentiometer 17 in which case the other one of the thyratrons, namely the thyratron 20 is ignited.

In actual practice, the arrangement operates as follows:

First, the probe electrodes 1 and 2 are positioned within the bath in a selected area where the current density is to be regulated in such a manner that the probe electrode 1 faces the cathode 31 and the probe electrode 2 faces the anode 30. When direct current is applied from the terminals 32 and a current flows between the cathode and anode, a definite direction of current in the selected area of the electrolyte is established. Consequently, a potential gradient directed in the same direction as the flow of current is established between the probe electrodes 1 and 2 provided that these electrodes are oriented, as they are spaced from one another, in accordance therewith. As a rule, the selected area of the electrolyte is that area where in the particular case of operation the amount of current density is most critical.

Now, the potentiometers 10 and 11 are adjusted in accordance with the particular conditions and requirements of the electrolytic process to be carried out in the electrolytic bath.

First, the switch members 8, 9, 14 and 18 are set to position I. In this position of the switches, the probe electrodes 1 and 2, the resistors 4 and 5, and that portion of the variable resistors 7 located between its tap and the point A constitute the legs of a bridge circuit. The remaining portion of the resistor 7 and the auxiliary resistor 6 are shunted and ineffective by the parallel connection established by switch member 9. The bridge circuit is energized at the diagonal points A and C by the alternating current applied to the input terminals 15. The device for measuring a potential difference (elements 10—13) is connected with the diagonal points B and D so that the indicating instrument 12 will indicate the balanced or unbalanced condition of the bridge circuit. The entire current regulator arrangement 19—28 is disconnected by the position of switch member 18. Now, the bridge circuit can be balanced by moving the tap of the variable resistor 7 until the indicating instrument 12 points to "0." It should be noted that when the bridge circuit is balanced in this manner, the resistance existing between the position of the tap of the variable resistor 7 and the point A is inversely proportional with the specific conductivity of the electrolyte, while, of course, the resistance existing between the position of the tap of the resistor 7 and the point B (while being shunted during the operation of the bridge circuit) would be approximately proportional with the specific conductivity of the electrolyt.

Now, the switch members 8, 9, 14 and 18 are moved to position II. In this switch position, the bridge circuit is disconnected from the input terminals 15 and thus from the input alternating current, as well as from the device 10—13 for measuring a potential difference. Only the reference voltage adjustable by means of the potentiometer 17 is applied to the device 10—13 for measuring potential differences. Now, the potentiometer 17 is adjusted in such a manner that the indicating instrument 12 indicates on the appropriate scale thereof a predetermined or desired current density to be reached in the above mentioned selected area of the electroylte, or a value related to and depending upon the local current density, e.g. the thickness of an electrolytic deposit to be deposited per unit of time and to be automatically regulated and maintained by means of the present arrangement. After this adjustment of the potentiometer 17, the adjusted reference voltage is equal to that potential difference betwen the probe electrodes which will appear at the input of the potentiometer 10 provided that the current density in that selected area or the values depending therefrom have the desired or predetermined value.

Now, the switch members 8, 9, 14 and 18 are moved to position III. In this switch position, the potential difference between the probe electrodes 1 and 2 is so divided by the resistors 6 and 7 that the portion thereof which appears between the interconnected points B and D, on one hand, and the tap of resistor 7 as set by the previous balancing of the bridge circuit, on the other hand, represents substantially a measurement of the current density. This is due to the fact that the potential difference between the probe electrode 1 and 2 is proportional with the current density and inversely proportional with the specific conductivity of the electrolyte, while the resistance between the tap of the resistor 7 and the points B—D has been set during the bridge balancing operation so as to be approximately proportional to the specific conductivity of the electrolyte.

Moreover, in the poistion III of the switch members 8, 9, 14, 18, that portion of the potential difference between the probe electrodes 1, 2 which portion is indicative of the local current density in the electrolyte, is applied to the input of the amplifier 19 in series with the reference voltage adjusted by the potentiometer 17 and having opposite polarity.

If the current density at the probe electrodes 1 and 2 is larger than a predetermined value then the potential difference between the tap of the resistor 7 and the points B, D is greater than the reference voltage. In this case, the input voltage applied to the amplifier 19 has the same polarity as the potential difference appearing between the probe electrodes. This causes the thyratron 21 to ignite and the connected relay 23 causes the motor 24 to rotate in such a direction of turn that the tap 27 of the regulator resistance 28 is moved toward the right as seen in the drawing, i.e. in a current reducing direction whereby the current and current density in the electrolyte is reduced. Consequently, the potential difference between the electrodes 1 and 2 would decrease and with it the potential difference appearing between the tap of the resistor 7 and the points B, D and being indicative of the actual current density. The regulating operation will last only until the potential difference just mentioned is of the same magnitude as the reference voltage adjusted at the potentiometer 17. In this case, the input voltage applied to the amplifier 19 is zero and none of the two thyratrons 20 and 21 is ignited so that the contacts of both relays 22 and 23 are in open position, thus causing the motor 24 to stand still so that the current density determined by the position of the tap 27 on resistor 28 remains now unchanged.

If, however, the current density at the probe electrodes 1 and 2 is smaller than the above mentioned predetermined value, then the potential difference appearing between the tap of the resistor 7 and the points B, D will be smaller than the reference voltage. In this case, the input voltage applied to the amplifier 19 will have the same polarity as the reference voltage which is always opposite to the polarity of the potential difference between the probe electrodes. In this case, the thyratron 20 is ignited, the relay 22 is energized whereby the motor 24 is caused to rotate in such a direction of turn that the tap 27 of the regulator resistance 28 is moved in direction to the left, as seen in the drawing, i.e. in a current increasing direction so as to cause the current and current density in the electrolyte also to increase. Consequently, also the potential difference between the probe electrodes 1 and 2 increases and so does the potential difference appearing between the tap of the resistor 7 and the points B, D which latter potential difference is indicative of the actual current density. Again, the resulting regulating operation will last only until the last mentioned potential difference is of same value as the reference voltage adjusted at the potentiometer 17. When this condition is reached, the input voltage applied to the amplifier 19 is again zero and again none of the two thyratrons 20 and 21 are ignited, the motor is stopped and the predetermined or desired current density is reached and maintained.

Since in position III of the switch members 8, 9, 14 and 18, the potential difference between the probe electrodes 1 and 2, after being divided at the resistor 6 and 7, is applied to the device for indicating a potential difference, the indicating instrument 12 will always indicate on the proper scale thereof the current density or the values depending on and related to the current density. In this manner, the indicating instrument is extremely useful for currently checking the execution of an electrolytic deposition or surface treatment process. Whenever changes of temperature, concentration or composition of the electrolyte should occur, it is only necessary in position I of the switch members 8, 9, 14 and 18 to repeat the balancing operation of the bridge circuit as described above in order to obtain a new suitable setting.

The thyratrons 20 and 21 may be replaced with similar effect by polarized relays.

The current regulator means described above are only suggested by way of example and may be replaced by other regulator means to the same effect. For instance, the regulator means may comprise a variable transformer connected at its primary side with a source of alternating potential and at its output side with a rectifier which furnishes the direct current to the electrolytic bath. Also, a variable choke may be used which is connected between the source of alternating potential and a rectifier which furnishes then the direct current to the bath. Also, the variable resistors 27, 28 may be connected in the control circuit of a magnetic amplifier of an applied alternating current, the output of that amplifier being connected with a rectifier for producing the direct current for the bath. Also, the resistors 27, 28 may be connected in the exciter circuit of a rotary converter which produces from the input alternating current the required direct current for the bath. Finally, the variable resistor arrangement 27, 28 may be replaced by an arrangement which controls and varies the control voltage of at least one of two thyratrons or similar discharge tubes which have their anode-cathode circuits connected in push-pull fashion in the alternating current circuit of a rectifier device which furnishes the direct current to the bath, the control of said thyratron being carried out so as to vary its output and/or phase.

If the arrangement according to the invention is used in connection with an electrolytic surface treatment process then the potentiometer 10 is to be calibrated and marked in accordance with the various types of such treatments, e.g. electrolytic oxidation, electrolytic polishing, and in reference to the materials to be treated, while the indicating instrument 12 is to be calibrated and marked in units of process time.

The circuit for measuring the conductivity of the electrolyte may also be a bridge circuit of the particular type in which two legs are replaced by a differential transformer.

It should be noted that the probe electrodes may be connected each via a respective condenser with the other arrangement for measuring the conductivity of the electrolyte in which case the measurement of conductivity may be carried out even during the actual execution of the electrolytic process in the bath.

It will be understood that each of the elements described above, or two or more together, may also find a useful application in other types of arrangements for regulating a current differing from the types described above.

While the invention has been illustrated and described as embodied in an arrangement for regulating current density and other factors in an electrolytic bath, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement for regulating the current density and related factors in an electrolytic bath equipped with anode and cathode means immersed in an electrolyte, comprising, in combination, a pair of probe electrodes immersed in the electrolyte between said cathode and anode means in an area where the current density is to be regulated to a predetermined value, said probe electrodes having each a terminal and being spaced from one another in direction of the current flowing between said cathode and anode means and adapted to make available at said terminals a voltage differential equal in polarity and magnitude to the voltage drop produced by the portion of said current flowing through the portion of said electrolyte located between said probe electrodes; a source of adjustable direct current reference voltage connected in series with said probe electrodes in such a manner that the polarity of said reference voltage is opposed to said voltage differential; and electrically controllable current regulator means including current varying means connected with said cathode and anode means for regulating the current flowing therebetween, said series-connected reference voltage source and probe electrodes being in circuit with the input terminals of said electrically controllable current regulator means for applying an input voltage thereto, and said regulator means being operative in such a manner that said current is reduced by said current varying means when said input voltage has one polarity due to the voltage differential between said probe electrodes being greater than the opposed reference voltage, and is increased when said input voltage has opposite polarity due to said voltage differential being smaller than the opposed reference voltage.

2. An arrangement for regulating the current density and related factors in an electrolytic bath equipped with anode and cathode means immersed in an electrolyte, comprising, in combination, a pair of probe electrodes immersed in the electrolyte between said cathode and anode means in an area where the current density is to be regulated to a predetermined value, said probe electrodes having each a terminal and being spaced from one another in direction of the current flowing between said cathode and anode means and adapted to make available at said terminals a voltage differential equal in polarity and magnitude to the voltage drop produced by the portion of said current flowing through the portion of said electrolyte located between said probe electrodes; a source of adjustable direct current reference voltage connected in series with said probe electrodes in such a manner that the polarity of said reference voltage is opposed to said voltage differential; electrically controllable current regulators means including current varying means connected with said cathode and anode means for regulating the current flowing therebetween, said series-connected reference voltage source and probe electrodes being in circuit with the input terminals of said electrically controllable current regulator means for applying an input voltage thereto, and said regulator means being operative in such a manner that said current is reduced by said current varying means when said input voltage has one polarity due to the voltage differential between said probe electrodes being greater than the opposed reference voltage, and is increased when said input voltage has opposite polarity due to said voltage differential being smaller than the opposed reference voltage; measuring means for measuring the conductivity of the electrolyte located between said probe electrodes; control means for adjusting said reference voltage to a predetermined potential difference; indicator means connected with said measuring means and calibrated for indicating potential differences and values proportional to such potential differences; and circuit means interconnecting said probe electrodes, said source of reference voltage, said indicator means, said current regulator means, and said measuring means, and including multi-pole switch means movable between a plurality of positions for alternately connecting, in one position, said reference voltage source and control means with said measuring means, in a second position said probe electrodes with said measuring means, and in a third position said probe electrodes in series with said reference voltage source and control means, and the resulting series combination in circuit with said electrical regulator means.

3. An arrangement as claimed in claim 2, wherein said measuring means include a bridge circuit connected with said probe electrodes and comprising at least one variable resistor means for balancing said bridge circuit and for serving as a voltage divider in such a manner that the adjusted ratio between input and output potential thereof is substantially proportional with the specific conductivity of the electrolyte.

4. An arrangement as claimed in claim 3, wherein said measuring means include at least one second variable voltage divider means cascade connected with said variable resistor, said second variable voltage divider being calibrated in accordance with predetermined desirable operating conditions of the electrolytic bath.

5. An arrangement as claimed in claim 1, wherein said current varying means include an adjustable current regulating means, adjusting means for adjusting said current regulator means for varying the current between said cathode and anode means, and motor means for operating said adjusting means in current increasing and decreasing directions, respectively, depending upon the direction of turn of said motor means, the direction of turn depending upon the polarity of said input voltage.

6. An arrangement as claimed in claim 5, wherein said current regulator means includes a variable resistor in circuit with said cathode and anode means.

7. An arrangement as claimed in claim 5, wherein said current regulator means includes at least one relay means energizable by said input voltage and having contact means in circuit with said motor means for changing its direction of turn depending upon the polarity of said input voltage.

8. An arrangement as claimed in claim 7, wherein said current regulator means includes direct current amplifier means for amplifying said input voltage, two thyratrons having their respective control circuits connected with the output of said amplifier means in push-pull arrangement, and first and second relay means respectively connected in the anode circuits of said thyratrons, respectively, for being energized thereby, said relay means having contacts respectively connected with said motor means in such a manner that energization of said first relay means determines one direction of turn of said motor means, while energization of said second relay means determines the opposite direction of turn of said motor means.

References Cited in the file of this patent

UNITED STATES PATENTS

| | | |
|---|---|---|
| 2,584,816 | Sands | Feb. 5, 1952 |
| 2,758,079 | Eckfeldt | Aug. 7, 1956 |
| 2,886,770 | Jackson et al. | May 12, 1959 |

FOREIGN PATENTS

| | | |
|---|---|---|
| 292,417 | Great Britain | June 21, 1928 |
| 557,455 | Canada | May 13, 1958 |

OTHER REFERENCES

"Analytical Chemistry," vol. 22, No. 9, September 1950, pages 1169–1172.